US010236777B2

(12) United States Patent
Graves

(10) Patent No.: US 10,236,777 B2
(45) Date of Patent: Mar. 19, 2019

(54) MAGNETICALLY ISOLATED FEEDBACK CIRCUITS AND REGULATED POWER SUPPLIES INCORPORATING THE SAME

(71) Applicant: L3 Cincinnati Electronics Corporation, Mason, OH (US)

(72) Inventor: Justin Graves, Middletown, OH (US)

(73) Assignee: L3 CINCINNATI ELECTRONICS CORPORATION, Mason, OH (US)

( * ) Notice: Subject to any disclaimer, the term of this patent is extended or adjusted under 35 U.S.C. 154(b) by 0 days.

(21) Appl. No.: 15/876,708

(22) Filed: Jan. 22, 2018

(65) Prior Publication Data

US 2019/0052164 A1 Feb. 14, 2019

Related U.S. Application Data

(60) Provisional application No. 62/542,907, filed on Aug. 9, 2017.

(51) Int. Cl.
| | |
|---|---|
| *H02M 3/335* | (2006.01) |
| *H02M 1/08* | (2006.01) |
| *H02M 3/156* | (2006.01) |
| *H02M 1/00* | (2006.01) |

(52) U.S. Cl.
CPC ............. *H02M 3/335* (2013.01); *H02M 1/08* (2013.01); *H02M 3/156* (2013.01); *H02M 2001/008* (2013.01)

(58) Field of Classification Search
CPC ... H02M 1/08; H02M 2001/008; H02M 3/156
See application file for complete search history.

(56) References Cited

U.S. PATENT DOCUMENTS

| 4,862,399 A | 8/1989 | Freeman |
| 4,890,217 A | 12/1989 | Conway |
| 5,113,333 A | 5/1992 | Ou |
| 5,394,319 A | 2/1995 | Attwood |
| 6,456,511 B1 * | 9/2002 | Wong ...................... H02M 1/36 363/21.13 |

(Continued)

OTHER PUBLICATIONS

Rampelli et al., Multiple-Output Magnetic Feedback Forward Converter with Discrete PWM for Space Applications,2012 IEEE International Conference on Power Electronics, Drives and Energy Systems, Bengaluru, India (2012), 6 pages.

(Continued)

*Primary Examiner* — Yusef A Ahmed
(74) *Attorney, Agent, or Firm* — Dinsmore & Shohl LLP

(57) ABSTRACT

Magnetically isolated feedback circuits and regulated power supplies are disclosed. In some embodiments, a magnetically isolated feedback circuit includes an isolated gate drive circuit and a forward converter circuit. The isolated gate drive circuit is operable to receive a plurality of pulses, wherein the isolated gate drive circuit produces a plurality of isolated bi-polar pulses from the plurality of pulses. The forward converter circuit is electrically coupled to the isolated gate drive circuit and is operable to be electrically coupled to a load. The plurality of isolated bi-polar pulses causes the forward converter circuit to sample a voltage at the load as a sampled voltage. The forward converter circuit is operable to provide the sampled voltage to a feedback input of a pulse width modulator.

9 Claims, 2 Drawing Sheets

(56) References Cited

U.S. PATENT DOCUMENTS

| | | | | |
|---|---|---|---|---|
| 6,671,193 B1* | 12/2003 | Pelkonen | ................. | H02M 1/32 |
| | | | | 361/93.1 |
| 7,349,229 B1* | 3/2008 | Yang | ....................... | H02M 1/40 |
| | | | | 363/21.13 |
| 7,477,096 B2 | 1/2009 | Summer | | |
| 8,908,390 B2 | 12/2014 | Strzalkowski | | |
| 9,293,999 B1 | 3/2016 | Lam et al. | | |
| 9,419,448 B1 | 8/2016 | Cilio et al. | | |
| 9,819,274 B2* | 11/2017 | Quigley | ............. | H02M 3/33546 |
| 9,887,635 B2* | 2/2018 | Yonezawa | ........... | H02M 3/3376 |
| 9,960,696 B2* | 5/2018 | Lawson | ............ | H02M 3/33561 |
| 2004/0257837 A1* | 12/2004 | Xu | ................... | H02M 3/33592 |
| | | | | 363/21.04 |
| 2007/0086219 A1* | 4/2007 | Yasumura | ......... | H02M 3/33507 |
| | | | | 363/21.02 |
| 2011/0292691 A1* | 12/2011 | Matsumoto | ....... | H02M 3/33523 |
| | | | | 363/21.12 |
| 2012/0281438 A1* | 11/2012 | Fang | ................. | H02M 3/33507 |
| | | | | 363/21.12 |
| 2013/0033905 A1* | 2/2013 | Lin | ................... | H02M 3/33507 |
| | | | | 363/21.13 |
| 2014/0112028 A1* | 4/2014 | Fahlenkamp | .......... | G01R 22/06 |
| | | | | 363/21.12 |
| 2015/0003121 A1* | 1/2015 | Yang | ................. | H02M 3/33523 |
| | | | | 363/21.17 |
| 2015/0055379 A1* | 2/2015 | Fang | ....................... | H02M 1/34 |
| | | | | 363/21.17 |
| 2015/0229223 A1* | 8/2015 | Cao | ................... | H02M 3/33515 |
| | | | | 363/21.13 |
| 2015/0381065 A1* | 12/2015 | Yonezawa | ........... | H02M 3/3378 |
| | | | | 363/25 |
| 2016/0043623 A1 | 2/2016 | Raytheon | | |
| 2016/0072393 A1* | 3/2016 | McIntyre | ............... | G01R 19/00 |
| | | | | 363/21.1 |
| 2016/0149504 A1* | 5/2016 | Quigley | .................. | H02M 1/36 |
| | | | | 363/21.04 |
| 2016/0226388 A1* | 8/2016 | Ren | ................... | H02M 3/33507 |
| 2016/0322904 A1* | 11/2016 | Tzeng | ............... | H02M 3/33507 |
| 2016/0365794 A1* | 12/2016 | Lawson | ............. | H02M 3/1584 |
| 2017/0214320 A1* | 7/2017 | Shi | ......................... | H02M 1/12 |
| 2018/0109197 A1* | 4/2018 | Quigley | ............ | H02M 3/33523 |

OTHER PUBLICATIONS

Baronti et al., DC/DC Switching Power Converter with Radiation Hardened Digital Control Based on SRAM FPGAs, Supported in part by the U.S. Defense Threat Reduction Agency (2004), 4 pages.

\* cited by examiner

MAGNETICALLY ISOLATED FEEDBACK CIRCUITS AND REGULATED POWER SUPPLIES INCORPORATING THE SAME

CROSS-REFERENCE TO RELATED APPLICATIONS

This application claims priority to U.S. Provisional Patent Application No. 62/542,907 entitled "Magnetically Isolated Feedback Circuits" and filed on Aug. 9, 2017, which is hereby incorporated by reference in its entirety.

BACKGROUND

Regulated power supplies provide a stable direct current (DC) output voltage over a wide range of load conditions. Such regulated power supplies may incorporate a feedback circuit that samples the output voltage and provides the sampled output voltage to a pulse width modulator that varies a pulse train provided to a transformer and regulate the output voltage accordingly. Such feedback circuits require electrical isolation, which may be provided by devices such as optocouplers. However, use of optocouplers may not be feasible in all environments, such as space environments having high levels of radiation.

SUMMARY

In some embodiments, a magnetically isolated feedback circuit includes an isolated gate drive circuit and a forward converter circuit. The isolated gate drive circuit is operable to receive a plurality of pulses, wherein the isolated gate drive circuit produces a plurality of isolated bi-polar pulses from the plurality of pulses. The forward converter circuit is electrically coupled to the isolated gate drive circuit and is operable to be electrically coupled to a load. The plurality of isolated bi-polar pulses causes the forward converter circuit to sample a voltage at the load as a sampled voltage. The forward converter circuit is operable to provide the sampled voltage to a feedback input of a pulse width modulator.

In some embodiments, a regulated power supply includes a pulse width modulator operable to produce a plurality of pulses at an output and receive a sampled voltage at a feedback input, a switching transistor having a gate electrically coupled to the output of the pulse width modulator, and an output transformer having an output primary and an output secondary, wherein the output primary is operable to be electrically coupled to a voltage source and is electrically coupled to a drain of the switching transistor, and the output secondary is operable to be electrically coupled to a load. The regulated power supply further includes a magnetically isolated feedback circuit including an isolated gate drive circuit and a forward converter circuit. The isolated gate drive circuit is electrically coupled to the output of the pulse width modulator, wherein the isolated gate drive circuit produces a plurality of isolated bi-polar pulses from the plurality of pulses. The forward converter circuit is electrically coupled to the isolated gate drive circuit, and is operable to be electrically coupled to the load. The plurality of isolated bi-polar pulses causes the forward converter circuit to sample a voltage at the load as the sampled voltage. The forward converter circuit is operable to provide the sampled voltage to the feedback input of the pulse width modulator.

In some embodiments, a magnetically isolated feedback circuit includes means for producing a plurality of magnetically isolated bi-polar pulses from a plurality of pulses, means for receiving the plurality of magnetically isolated bi-polar pulses to sample a voltage of a load, thereby producing a sampled voltage, and means for providing the sampled voltage to a pulse width modulator.

DETAILED DESCRIPTION

Embodiments of the present disclosure are directed to magnetically isolated feedback circuits that may be implemented in power supply circuits requiring a tightly regulated output voltage. As described in detail below, the embodiments described herein combine an isolated gate driver and a miniature forward converter that provides desirable power supply regulation and may provide rad/SEE-hardness, if desired.

The magnetically isolated feedback circuits described herein provide several advantages over conventional isolated feedback circuits. Particularly, embodiments described herein do not require a secondary-side oscillator integrated circuit (IC). Embodiments may avoid incorporating feedback windings into the main transformer, thereby eliminating changes to feedback performance when the transformer is modified. Further, embodiments may reduce or eliminate variation and high-stress conditions in the gate drive of the feedback transistor as input voltage and output load changes. This problem is inherent in implementations that drive the feedback switch from the secondary of the main transformer.

The components described herein may be implemented using any parts grade. As a non-limiting example, the components of the magnetically isolated feedback circuits may be fabricated from radiation-hardened components, such as from space-grade rad/SEE-hard to commercial rad/SEE-soft. Thus, the magnetically isolated feedback circuits described herein may be incorporated in power supplies deployed in space or nuclear applications, for example.

Figure 1:
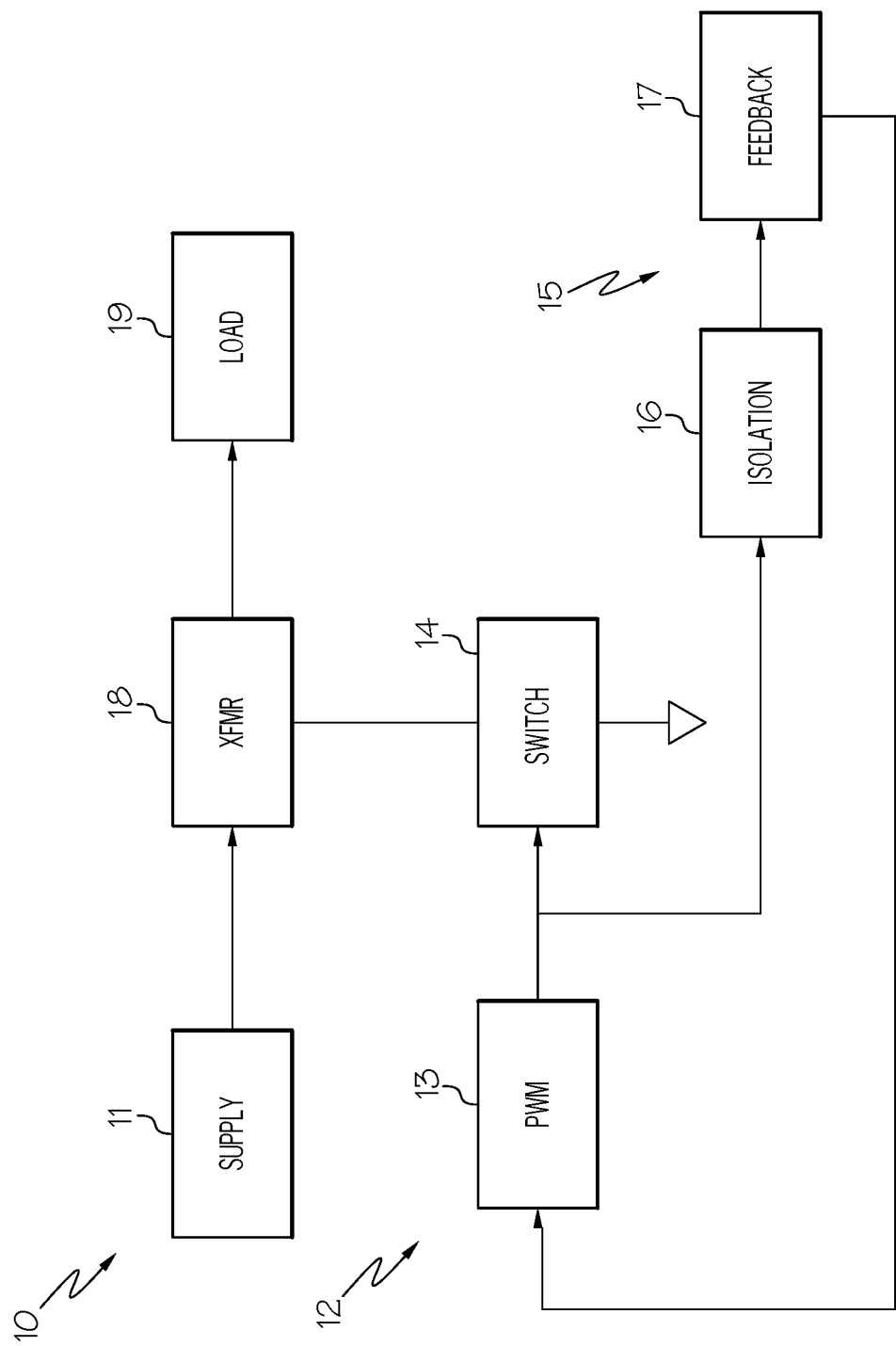
FIG. 1 schematically depicts an example regulated power supply incorporating an example magnetically isolated feedback circuit according to one or more embodiments described and illustrated herein.

Referring now to FIG. 1, an example regulated power supply 10 incorporating an example magnetically isolated feedback circuit 15 is schematically illustrated. The example regulated power supply 10 comprises a voltage supply 11 and output transformer circuit 18 operable to be electrically coupled to a load 19. As described herein, the phrase "electrically coupled" means either directly electrically coupled by electrical conductors or indirectly electrically coupled by way of intermediate electrical components and electrical conductors. The example regulated power supply 10 further comprises a switching circuit 12 and a magnetically isolated feedback circuit 15. The example switching circuit 12 includes a pulse width modulator 13 and a switch 14 that sequentially connects and disconnects an output transformer circuit 18 coupled to the load to regulate the direct current (DC) voltage provided at the output of the regulated power supply (i.e., at the load). The switching circuit 12 may be any known or yet-to-be-developed switching circuit capable of regulating DC voltage at the output of the regulated power supply 10.

The example magnetically isolated feedback circuit 15 comprises an isolated gate drive circuit 16 and a forward converter circuit 17. The isolated gate drive circuit 16 receives a plurality of pulses from the switching circuit 12 (e.g., from a pulse width modulator 13 and produces a plurality of isolated pulses by way of magnetic isolation. For example, the isolated gate drive circuit 16 may include an isolation transformer (not shown) that receives the plurality of pulses on a primary side and produces the plurality of isolated pulses on the secondary side of the transformer.

The plurality of isolated pulses generated by the isolated gate drive circuit 16 is provided to the forward converter circuit 17 to cause the forward converter 16 to sample the voltage at the connected load 19. Particularly, the forward converter 16 samples the voltage at the load 19 at substantially the frequency and duty cycle of the plurality of isolated pulses. This sampled voltage is then provided to the switching circuit 12 (e.g., a feedback input of the pulse width modulator 13). The switching circuit 12 receives the sampled voltage and adjusts the duty cycle and/or the frequency of the plurality of pulses to achieve substantially the desired output voltage at the load 19.

Figure 2:
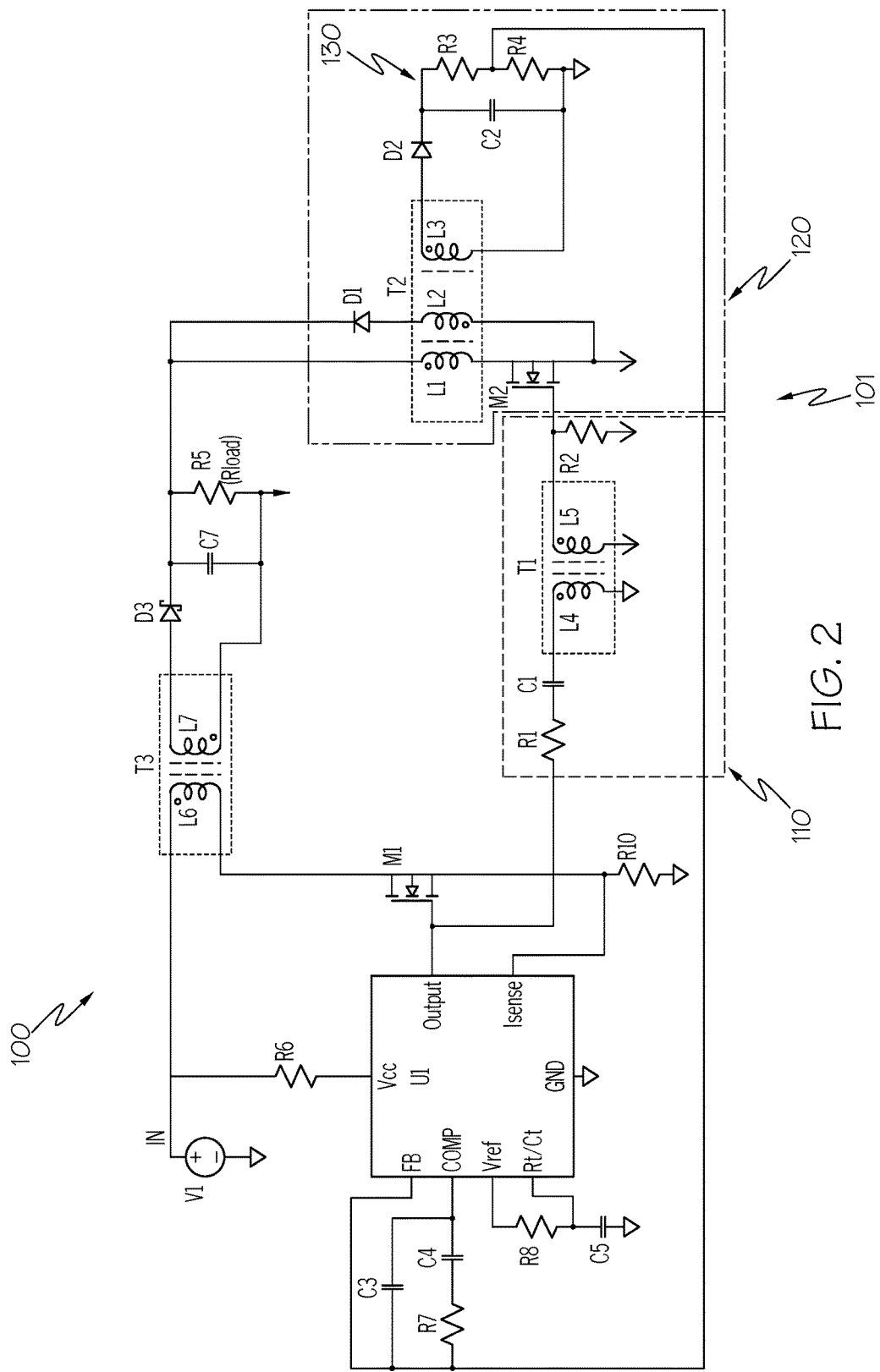
FIG. 2 schematically depicts an example regulated power supply incorporating an example magnetically isolated feedback circuit according to one or more embodiments described and illustrated herein.

Another example regulated power supply 100 incorporating an example magnetically isolated feedback circuit 101 is schematically illustrated by FIG. 2. It should be understood that the regulated power supplies described herein are not limited by the components depicted by FIG. 2. Additionally, it should be understood that the example magnetically isolated feedback circuit 101 depicted by FIG. 2 may be employed in regulated power supplies having configurations different from that depicted by FIG. 2. As described in more detail below, the example magnetically isolated feedback circuit 101 comprises an isolated gate drive circuit 110 and a forward converter circuit 120 that samples an output voltage of the regulated power supply and provides the sampled voltage as feedback to pulse width modulator U1.

Generally, the regulated power supply 100 further comprises pulse width modulator U1, switching transistor configured as metal-oxide field-effect transistor (MOSFET) M1, voltage supply V1, and output transformer T3. In one example, pulse width modulator U1 is a radiation-hardened pulse width modulator similar to the LT1245 pulse width modulator sold by Linear Technologies of Milpitas, Calif. It should be understood that other pulse width modulators may be utilized. Primary L6 (i.e., output primary) of output transformer T3 is electrically coupled to voltage supply V1 and the drain of MOSFET M1. Resistor R10 is electrically coupled to ground and the Isense pin of pulse width modulator U1 and the source of MOSFET M1. It is noted that the MOSFETs illustrated in FIG. 2 may be configured as any type of transistor, such as, without limitation, bi-polar junction transistors (BJTs) and insulated gate bi-polar transistors (IGBTs) depending on the end-application of the regulated power supply 100. Secondary L7 (i.e., output secondary) of output transformer T3 is operable to be electrically coupled to a load R5. In some embodiments, secondary L7 is electrically coupled to an anode of diode D3 such that the cathode of diode D3 is operable to be electrical coupled to the load R5. Diode D3 provides a Schottky barrier between the load R5 and secondary L7 of output transformer T3. Capacitor C7 may also be provided in parallel to the load R5.

Pulse width modulator U1 is operable to produce a plurality of pulses of a desired frequency and duty cycle at an output pin. The voltage, frequency and duty cycle of the plurality of pulses is not limited by this disclosure. As an example and not a limitation, the minimum voltage (i.e., low voltage) of the plurality of pulses is zero and the maximum voltage (i.e., high voltage) of the plurality of pulses is 12V and the duty cycle is less than 50%. A duty cycle of less than 50% may allow transformer T2 to reset as described in more detail below. The output pin of pulse width modulator U1 is electrically coupled to the gate of MOSFET M1, which sequentially connects and disconnects primary L6 of output transformer T3 from ground, thereby regulating the voltage at secondary L7 of output transformer T3. Pulse width modulator U1 is connected to voltage source V1 by resistor R6.

The example isolated gate drive circuit 110 comprises resistor R1, coupling capacitor C1, isolation transformer T1, and resistor R2, and is operable to receive the plurality of pulses from pulse width modulator U1 to produce a plurality of isolated bi-polar pulses. Particularly, a first side of resistor R1 is electrically coupled to the output pin of pulse width modulator U1 and a second side of resistor R1 is electrically coupled to a first side of coupling capacitor C1. A second side of coupling capacitor C1 is electrically coupled to a side of primary L4 (i.e., isolation primary) of isolation transformer T1. Coupling capacitor C1 receives the plurality of pulses and produces a plurality of bi-polar pulses. As an example and not a limitation, the coupling capacitor C1 transforms the +12V/0V pulse train (i.e., the plurality of pulses) into a +6V/−6V bi-polar pulse train (i.e., the plurality of bi-polar pulses) to drive isolation transformer T1. This bi-polar drive of isolation transformer T1 resets the magnetic core of the isolation transformer T1 every switching cycle. The drive of the isolation transformer T1 produces a plurality of isolated bi-polar pulses at secondary L5 (i.e., isolation secondary). Resistor R1 damps the LC resonance of C1/T1 during startup and transients. Resistor R2 provides a load for isolation transformer T1.

The output of the isolated gate drive circuit 110 is provided to the forward converter circuit 120. The example forward converter circuit 120 comprises MOSFET M2 as a transistor, feedback transformer T2, diode D1, diode D2, capacitor C3, and a voltage divider 130 defined by resistor R3 and resistor R4.

One side of secondary L5 of isolation transformer T1 is electrically coupled to the gate of MOSFET M2 such that the plurality of isolated bi-polar pulses drives MOSFET M2. Resistor R2 provides a pull-down to keep MOSFET M2 off during dv/dt transients. The drain of MOSFET M2 is electrically coupled to an end of primary L1 (i.e., isolation primary) of feedback transformer T2, and the source of MOSFET M2 is electrically coupled to ground shared with secondary L7 of output transformer T3 and the load.

One side of secondary L3 of feedback transformer T2 is electrically coupled to ground shared with voltage supply V1 and pulse width modulator U1, and the other side is electrically coupled to the anode of diode D2. The voltage divider circuit 130 includes series resistors R3 and R4. One side of resistor R3 is electrically coupled to the cathode of diode D2, while the other side is electrically coupled to resistor R4. One side of resistor R4 is electrically coupled to ground shared with voltage supply V1 and pulse width modulator U1. Feedback capacitor C2 is in parallel with series resistors R3 and R4. Resistor R3 and resistor R4 provide an output of the voltage divider that is electrically coupled to a feedback input pin of pulse width modulator U1.

In the example embodiment, feedback transformer T2 has a third winding L2 that is electrically coupled to ground shared with secondary L7 of output transformer T3 and the load R5, and to the anode of diode D1. The cathode of diode D1 is electrically coupled to a positive side of the load R5.

MOSFET M2 turns on when the plurality of isolated bi-polar pulses goes high, which samples the power supply output voltage across the primary L1 of feedback transformer T2. The sampled power supply output voltage is mirrored on the secondary L3 (i.e., feedback secondary) of feedback transformer T2, where the sampled voltage is peak detected by diode D2 and capacitor C2. The peak sampled voltage (i.e., the sampled voltage) is divided down by R3 and R4 to provide feedback to pulse width modulator U1.

When the plurality of isolated bi-polar pulses goes low, third winding L2 of feedback transformer T2 provides a reset path for the magnetizing current of feedback transformer T2. The discharge time constant of R3/R4 and C2 allow the feedback signal to increase or decrease as needed, in response to line, load, and temperature changes.

Other ancillary electrical components are schematically depicted in FIG. 2. It should be understood that embodiments are not limited by these ancillary electrical components. In the example of FIG. 2, capacitor C5 connects the Rt/Ct pin of pulse width modulator U1 to ground, and resistor R8 connects the Vref pin to the Rt/Ct pin to set the oscillator frequency of pulse width modulator U1. Resistor R7 and capacitor C4 are electrically coupled in series between the output of the voltage divider 130 and the compensation pin of pulse width modulator U1, and capacitor C3 is provided in parallel with resistor R7 and capacitor C4.

Isolation transformer T1 and feedback transformer T2 described above may be magnetics, or the windings of T1 and T2 may be traces in the printed wiring board for reliability and simplicity. The example circuit depicted by FIG. 2 may be ideal for high-efficiency applications. In one non-limiting regulated power supply example, simulation estimates the power dissipation of the circuit illustrated by FIG. 2 to be 68.7 mW with the electrical components characterized by Table 1. It should be understood that embodiments described herein are not limited by Table 1, and the values of Table 1 are for illustrative purposes only.

TABLE 1

| Part | Value | Part Number |
|------|-------|-------------|
| C1 | 1 μF | |
| C2 | 0.01 μF | |
| C3 | 10 nF | |
| C4 | 0.1 μF | |
| C5 | 1 nF | |
| C7 | 100 μF | |
| R1 | 10 Ω | |
| R2 | 1 kΩ | |
| R3 | 10 kΩ | |
| R4 | 1 kΩ | |
| R5 | — | |
| R6 | 1 kΩ | |
| R7 | 1 kΩ | |
| R8 | 1 kΩ | |
| R10 | 0.01 Ω | |
| L1 | 1 mH | |
| L2 | 1 mH | |
| L3 | 1 mH | |
| L4 | 1 mH | |
| L5 | 1 mH | |
| L6 | 30 μH | |
| L7 | 120 μH | |
| D1 | | 1N4148 |
| D2 | | 1N4148 |
| D3 | | MBR40250 |
| M1 | | IPB065N15N3 |
| M2 | | BSH114 |
| U1 | | LT1245 |

The example circuit depicted by FIG. 2 and defined by Table 1 may provide the following performance characteristics: 1) 0.05% worst-case load regulation over a −34° C. to +85° C. range, 2) 0.6% worst-case line regulation over the −34° C. to +85° C. range, 3) 1.77% worst-case temperature regulation over the −34° C. to +85° C. range, and 4) the worst-case min and max measured output voltages over the entire line, load, and temperature range are only separated by 1.77%.

Although FIG. 2 shows MOSFET M2 as a MOSFET feedback switch, the MOSFET may be replaced with a BJT in applications where: 1) the power supply switching frequency is low (e.g., about 100 kHz) or 2) the power supply output voltage is low (e.g., less than 15 V). BJT use may be limited by their long storage time when saturated, which limits their switching speed. Thus, MOSFETs may be used in all applications, but BJTs may be used in some applications.

Further, the example circuit of FIG. 2 may be used in telemetry applications. Particularly, the circuit shown in FIG. 2 may be used to send analog or digital telemetry across an isolation barrier. This may be useful in sending discrete telemetry from a secondary side component back to the primary side component, such as a spacecraft. For isolated telemetry applications, only the following components are needed: MOSFET M2 (driven by an FPGA, oscillator, periodic pulse, etc.), feedback transformer T2, diode D1, diode D2, feedback capacitor C2, resistor R3, and resistor R4.

It should now be understood that embodiments of the present disclosure are directed to magnetically isolated feedback circuits that may be implemented in power supply circuits requiring a tightly regulated output voltage. The embodiments described herein combine an isolated gate driver and a miniature forward converter that provide desirable power supply regulation and may provide rad/SEE-hardness for space applications, if desired.

For the purposes of describing and defining embodiments of the present disclosure, it is noted that the terms "approximately" and "substantially" are utilized herein to represent the inherent degree of uncertainty that may be attributed to any quantitative comparison, value, measurement, or other representation. The terms "approximately" "substantially" are also utilized herein to represent the degree by which a quantitative representation may vary from a stated reference without resulting in a change in the basic function of the subject matter at issue.

The foregoing description of the various embodiments described herein has been presented for the purposes of illustration and description. It is not intended to be exhaustive or to limit the embodiments to the precise steps and/or forms disclosed. Many alternatives, modifications and variations will be apparent to those skilled in the art of the above teaching. Moreover, although multiple inventive aspects have been presented, such aspects need not be utilized in combination, and various combinations of inventive aspects are possible in light of the various embodiments provided above. Accordingly, the above description is intended to embrace all possible alternatives, modifications, combinations, and variations that have been discussed or suggested herein, as well as all others that fall with the principles, spirit and broad scope as defined by the claims.

The invention claimed is:

1. A regulated power supply comprising:
   a pulse width modulator operable to produce a plurality of pulses at an output and receive a sampled voltage at a feedback input;

a switching transistor comprising a gate electrically coupled to the output of the pulse width modulator;

an output transformer comprising an output primary and an output secondary, wherein the output primary is operable to be electrically coupled to a voltage source and is electrically coupled to a drain of the switching transistor, and the output secondary is operable to be electrically coupled to a load;

a magnetically isolated feedback circuit comprising:
  an isolated gate drive circuit directly coupled to the output of the pulse width modulator, wherein the isolated gate drive circuit produces a plurality of magnetically isolated bi-polar pulses from the plurality of pulses directly received from the output of the pulse width modulator; and
  a forward converter circuit directly coupled to the isolated gate drive circuit for receiving the plurality of magnetically isolated bi-polar pulses, wherein:
    the forward converter circuit is operable to be electrically coupled to the load;
    the plurality of magnetically isolated bi-polar pulses causes the forward converter circuit to sample a voltage at the load as the sampled voltage; and
    the forward converter circuit is operable to provide the sampled voltage to the feedback input of the pulse width modulator, wherein the forward converter circuit is directly coupled to the pulse width modulator.

2. The regulated power supply of claim 1, wherein the isolated gate drive circuit comprises a coupling capacitor that receives the plurality of pulses and produces the plurality of magnetically isolated bi-polar pulses.

3. The regulated power supply of claim 2, wherein:
the isolated gate drive circuit comprises an isolation transformer having a primary and a secondary;
the coupling capacitor is electrically coupled to the primary of the isolation transformer; and
the plurality of magnetically isolated bi-polar pulses is provided at the secondary of the isolation transformer.

4. The regulated power supply of claim 1, wherein the forward converter circuit comprises a transistor and a feedback transformer.

5. The regulated power supply of claim 4, wherein:
the feedback transformer comprises a feedback primary and a feedback secondary;
the feedback primary is operable to be directly connected to the load for sampling the voltage at the load and is electrically coupled to a drain of the transistor; and
a gate of the transistor is operable to receive the plurality of magnetically isolated bi-polar pulses.

6. The regulated power supply of claim 5, wherein the forward converter circuit further comprises a voltage divider directly connected to the feedback secondary of the feedback transformer, wherein an output of the voltage divider divides the sampled voltage at the feedback secondary to provide to the feedback input of the pulse width modulator.

7. The regulated power supply of claim 6, wherein the forward converter circuit further comprises a diode electrically coupled between the feedback secondary and the voltage divider for detecting a peak of the sampled voltage from the feedback secondary and transmitting the sampled voltage to the voltage divider, and a feedback capacitor in parallel with the voltage divider.

8. The regulated power supply of claim 5, wherein the feedback transformer comprises a third winding providing a reset path for magnetizing current within the feedback transformer.

9. The regulated power supply of claim 1, wherein the magnetically isolated feedback circuit is fabricated from radiation hardened components.

* * * * *